(12) United States Patent
Novick et al.

(10) Patent No.: US 8,984,655 B2
(45) Date of Patent: Mar. 17, 2015

(54) LICENSE INFORMATION ACCESS BASED ON DEVELOPER PROFILES

(71) Applicant: Microsoft Corporation, Redmond, WA (US)

(72) Inventors: Steven M. Novick, Seattle, WA (US); Avijit Sinha, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/652,224

(22) Filed: Oct. 15, 2012

(65) Prior Publication Data

US 2014/0109236 A1    Apr. 17, 2014

(51) Int. Cl.
| G06F 15/16 | (2006.01) |
| G06F 21/10 | (2013.01) |
| G06F 7/04 | (2006.01) |
| G06F 17/30 | (2006.01) |
| H04L 29/06 | (2006.01) |

(52) U.S. Cl.
CPC .................................... *G06F 21/10* (2013.01)
USPC .................................... 726/27; 726/3; 726/26

(58) Field of Classification Search
USPC ................................................ 726/26–27, 3
See application file for complete search history.

(56) References Cited

U.S. PATENT DOCUMENTS

| 5,260,999 | A | 11/1993 | Wyman | |
| 6,859,792 | B1 * | 2/2005 | Marjadi et al. | 705/59 |
| 7,139,737 | B2 | 11/2006 | Takahashi et al. | |
| 7,231,370 | B1 | 6/2007 | Kapur | |
| 7,346,585 | B1 * | 3/2008 | Alabraba et al. | 705/59 |
| 7,565,325 | B2 | 7/2009 | Lenard et al. | |
| 2002/0078380 | A1 * | 6/2002 | Lin et al. | 713/201 |
| 2004/0064714 | A1 * | 4/2004 | Carr | 713/193 |
| 2004/0103303 | A1 * | 5/2004 | Yamauchi et al. | 713/200 |
| 2005/0289072 | A1 | 12/2005 | Sabharwal | |
| 2006/0036554 | A1 | 2/2006 | Schrock et al. | |
| 2006/0085350 | A1 | 4/2006 | Samayamantry et al. | |
| 2006/0224520 | A1 * | 10/2006 | Vijay et al. | 705/59 |
| 2008/0313264 | A1 * | 12/2008 | Pestoni | 709/202 |
| 2009/0249071 | A1 * | 10/2009 | De Atley et al. | 713/171 |
| 2009/0326964 | A1 * | 12/2009 | Garg et al. | 705/1 |
| 2011/0154305 | A1 * | 6/2011 | LeRoux et al. | 717/140 |
| 2011/0154439 | A1 * | 6/2011 | Patel et al. | 726/3 |

OTHER PUBLICATIONS

Apple Inc.; "App Store Volume Purchase Program for Business;" 2011; pp. 1-5; http://images.apple.com/business/docs/VPP_Business_Guide_US_6_4_2012.pdf.

* cited by examiner

*Primary Examiner* — Shin-Hon Chen
(74) *Attorney, Agent, or Firm* — Steve Crocker; Sade Fashokun; Micky Minhas

(57) ABSTRACT

Disclosed herein are systems, methods, and software for facilitating application licensing. In at least one implementation, license information for an application is identified based at least in part on a developer profile associated with the application and a state of a license for the application identified from at least a portion of the license information. Presentation of the application in accordance with the state of the license for the application can then be initiated.

20 Claims, 6 Drawing Sheets

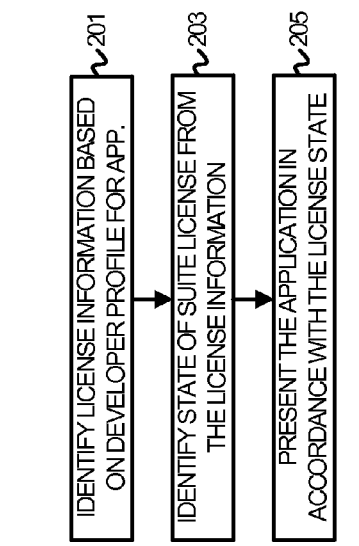

LICENSE INFORMATION ACCESS BASED ON DEVELOPER PROFILES

TECHNICAL FIELD

Aspects of the disclosure are related to computer hardware and software technology, and in particular, to software licensing technology.

TECHNICAL BACKGROUND

A variety of licensing models can be employed to license software applications. Licensing information, sometimes stored locally, remotely, or elsewhere, is typically referenced to determine the state of a software license. The license information may indicate, for example, that a license is current, expired, unpaid, or the like. The subject application can then be presented, or in some cases not presented at all, based on the state of the license.

In a familiar example, many productivity applications are programmed upon launch to process locally stored license information in order to determine their respective license states. A fully paid license may grant a user with full access to a particular application, while an unpaid license for that application may relegate the user to a limited application experience. In the latter case, many applications prompt the user to obtain a license by way of a website, application store, or other purchase environment.

Indeed, an increasing number of applications are themselves obtained through application stores for download and execution on mobile devices, such as cell phones, tablets, laptop computers, and other mobile appliances. Upon obtaining an application license through an application store, licensing information is conveyed along with the application to the target device and stored in a segregated memory location allocated to that application. Launching the application may trigger analysis of the license information so that the application can be presented in accordance with its license state.

OVERVIEW

Provided herein are systems, methods, and software for facilitating application licensing. In at least one implementation, license information for an application is identified based at least in part on a developer profile associated with the application and a state of a license for the application identified from at least a portion of the license information. Presentation of the application in accordance with the state of the license for the application can then be initiated.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an application environment in an implementation.

FIG. 2 illustrates an application process in an implementation.

FIG. 3 illustrates a computing system in an implementation.

TECHNICAL DISCLOSURE

Figure 4:
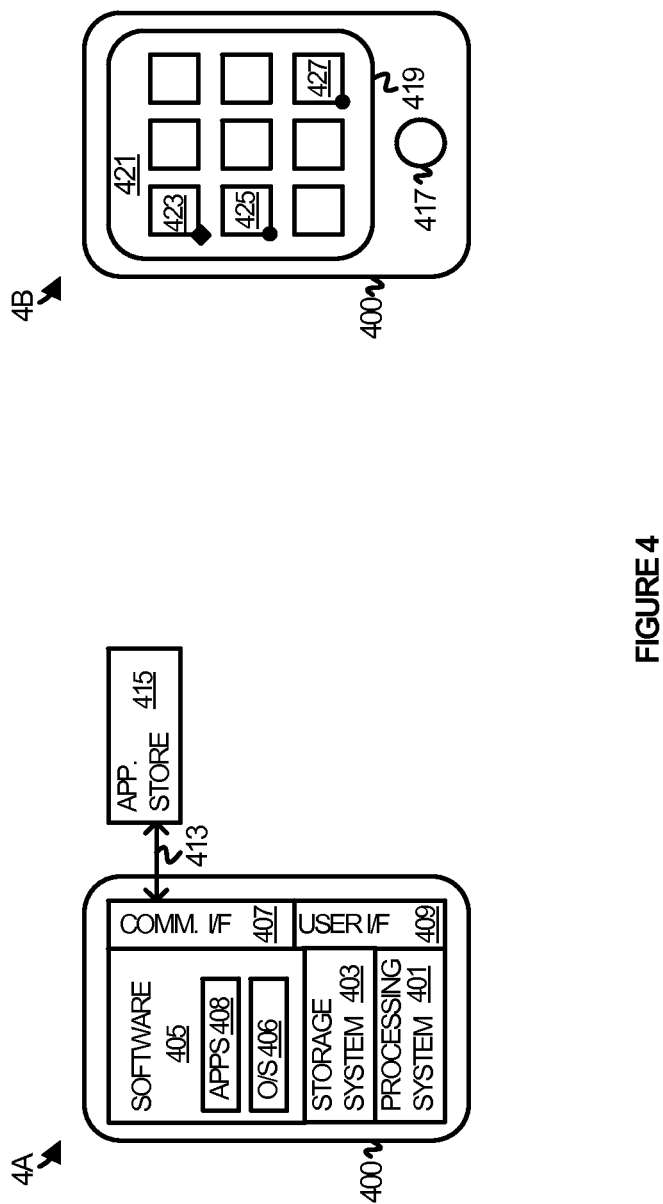
FIG. 4 illustrates a communication device in an implementation.

Implementations described herein provide for accessing licensing information based on a developer profile associated with an application. In this manner, license information may be accessed on behalf of multiple applications, each having a developer profile in common with the other applications. For example, a license may be obtained for a suite of applications and license information stored indicative of the state of the license. Upon launching an application from the application suite, the license information may be accessed based on a developer profile associated with the application. Thus, when another application from the suite is launched, the same license information may be accessed. In fact, such a configuration allows access to license information for any application, regardless of whether or not it belongs to an application suite, to be governed based on the identity of or profile for a developer of the application.

Upon accessing license information for an application, the application may be presented in accordance with its license state. In some scenarios an application mode may be determined based on the license state and the application presented in the determined application mode. Examples of license states include a fully paid state, a free state, and a recently expired state, as well as other suitable license states. Example application modes include an unrestricted access mode, a restricted access mode, and a temporality unrestricted access mode, as well as other application modes.

In some implementations, the license information may be stored in and retrieved from a data structure accessible based on an identity of a developer of the application indicated by the developer profile. To retrieve the license information, an application may communicate a request to a utility application to access the data structure. One exemplary utility application is a keychain service application.

In various scenarios involving one such keychain service application or keychain utility, an application may communicate license information to the keychain utility, such that the license information may be stored in a keychain data structure accessible based on the developer profile associated with the application. The application or another application associated with the same developer may also communicate with the keychain utility to access the license information.

For example, to initiate writing license information to a keychain data structure, and application may initiate a first request to a keychain utility or other utility application to access a keychain data structure. The keychain utility may then initiate writing of the license information to the keychain data structure. To initiate reading the license information from the keychain data structure, the application may initiate a second request to the utility application to access the keychain data structure. The keychain utility may then read the license information from the keychain data structure. Note that the modifiers first and second are used herein merely to distinguish the requests and are note intended to denote an order or sequence or otherwise limit the scope of the present disclosure.

Figure 5:
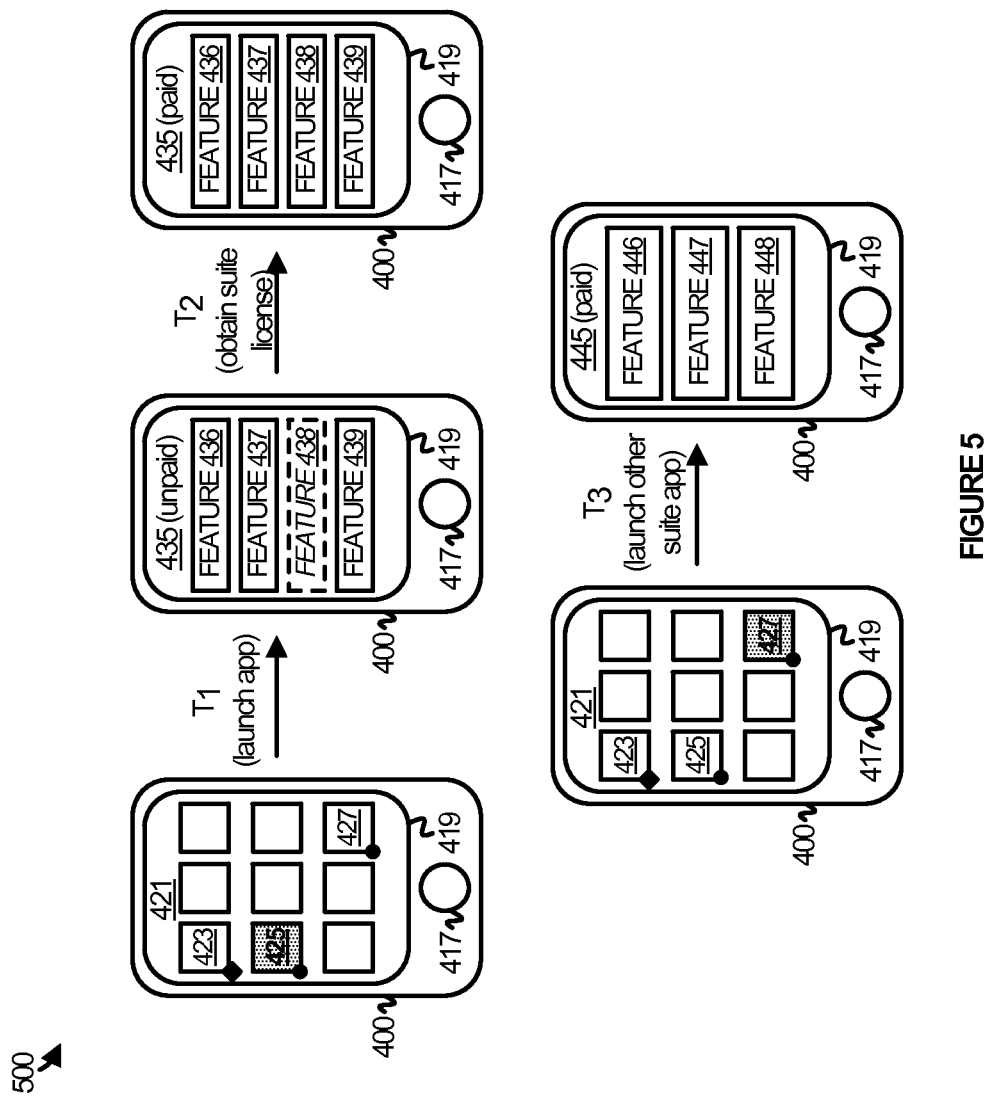
FIG. 5 illustrates an operational sequence in an implementation.
Figure 6:
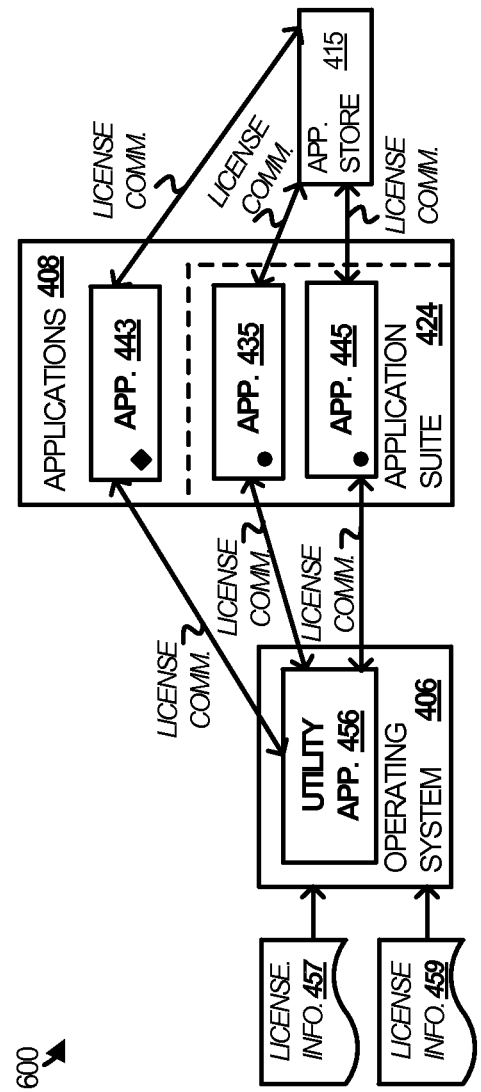
FIG. 6 illustrates a detailed view of software in an implementation.
Figure 7:
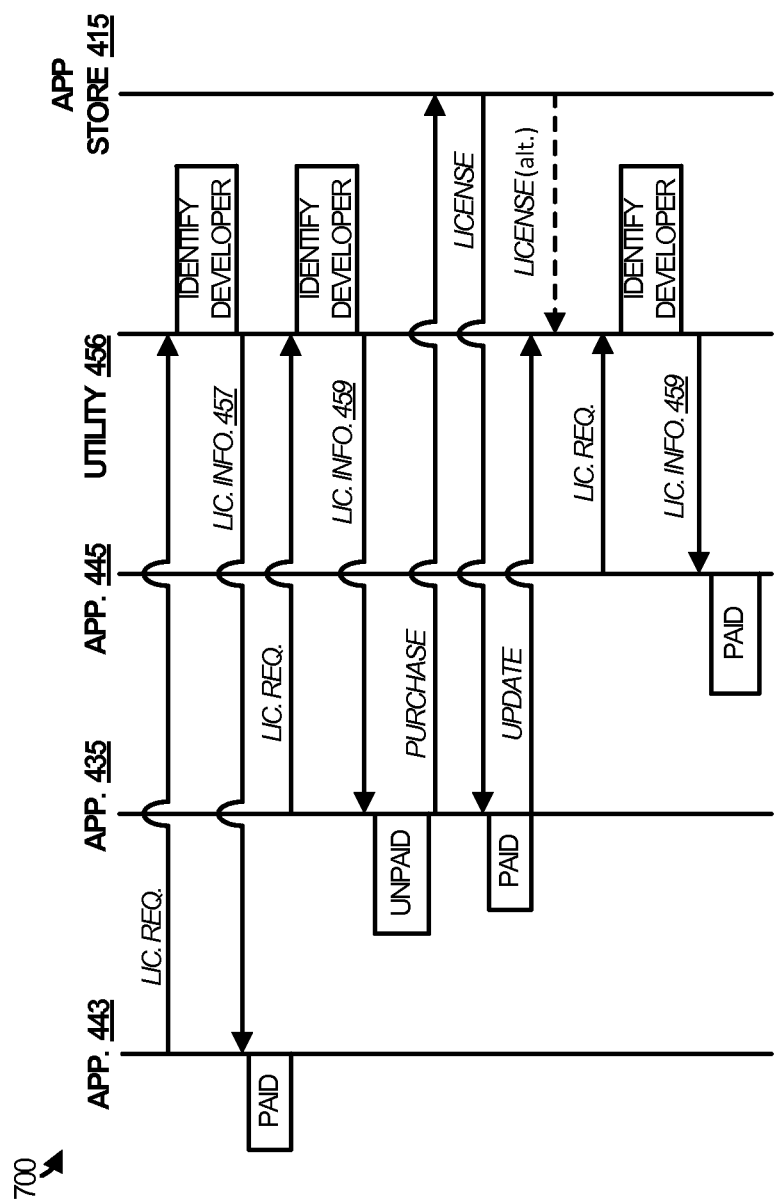
FIG. 7 illustrates an operational scenario in an implementation.
Figure 8:
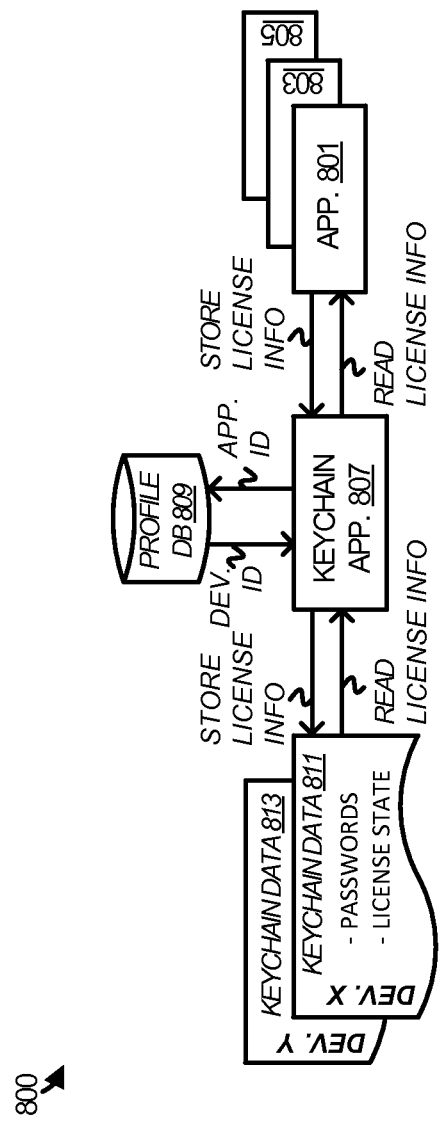
FIG. 8 illustrates an application environment in an implementation.

With reference to the drawings, FIG. 1 illustrates an exemplary application environment in an implementation whereby an application process is employed to facilitate application licensing. FIG. 2 illustrates one such application process, while FIG. 3 illustrates a computing system suitable for implementing at least the application process and optionally the application environment. FIG. 4 illustrates an exemplary communicate device in which another application environment may be implemented. FIG. 5 illustrates an operational scenario involving the communication device form FIG. 4, while FIG. 6 illustrates a detailed view of software employed in the communication device. FIG. 7 illustrates an operational scenario involving the communication device. FIG. 8 illustrates an exemplary application environment that includes a keychain application utility.

Referring now to FIG. 1, application environment 100 is illustrated in an implementation. Application environment 100 includes application 101, application 103, and application 105. Applications 101, 103 and 105 are associated with developer profiles 102, 104, and 106 respectively. For illustrative purposes, application 101 and application 103 are both associated with one developer, developer A, while application 105 is associated with a different developer, developer B. Application environment 100 also includes license information 107 and license information 109, which are also associated with developer profiles 108 and 110 respectively. For illustrative purposes, license information 107 is associated with developer A, while license information 109 is associated with developer B.

Applications 101, 103, and 105 may each be any program application capable of being presented in accordance with the state of an associated license identified from license information, such as license information 107 or license information 109. Examples of program applications include productivity applications, gaming applications, enterprise applications, and communication applications, as well as any other suitable program application.

The license information may be accessed based at least in part on the developer profile associated with a particular application. For example, the state of application 101 and the state of application 103 may be identified from license information 107 because both applications 101 and 103 are associated with the same developer, while the state of application 105 may be identified from license information 109. Developer profiles 102, 104, and 106 may be representative of any information that identifies a developer associated with applications 101, 103, and 105. The information may be communicated by applications 101, 103, and 105, or may be communicated by some other application. The information may be stored locally, stored remotely, or stored in some other fashion.

Application presentation 111 is representative of the presentation of application 101 under one license state, while application presentation 113 is representative of the presentation of application 101 under another licenses state as denoted by varying fill patterns. Application presentations 111 and 113 demonstrate that the appearance, functions, features, or other aspects of an application may vary depending upon the license state of the application. There may be a variety of license states, such as paid, unpaid, free, and recently expired, as well as any other suitable license state, according to which an application may be presented. For example, the features, functions, and other application aspects available in one license state may differ relative to the features, functions, and other application aspects available in another license state.

FIG. 2 illustrates application process 200 in an implementation, as discussion of which follows with reference to application environment 100 for purposes of clarity. Application process 200 is representative of any process, sub-process, or collection of processes that may be employed to enforce or otherwise support application licensing.

To begin, license information for application 101 is identified based on a developer profile associated with application 101 (step 201). This may occur in response to, for example, application 101 being launched, started, or otherwise invoked such that an attempt to verify its license state is triggered. Depending upon the developer profile associated with application 101, either license information 107 or license information 109 is accessed. In this example, application 101 is associated with developer A, as indicated by developer profile 102. Accordingly, license information 107 is accessed because of its shared association with developer A, as indicated by developer profile 108.

The state of the license for application 101 is then determined from license information 107 (step 203). As mentioned above, license information 107 may indicate any of a variety of license states, such as paid, unpaid, free, and recently expired, as well as any other suitable license state. For example, the features, functions, and other application aspects available in one license state may differ relative to the features, functions, and other application aspects available in another license state.

Having determined the license state, application 101 is presented in accordance with the license state (step 205). Application presentation 111 is representative of the presentation of application 101 in one license state, while application presentation 113 is representative of the presentation of application 101 in a different license state. For example, application presentation 111 may include some features, functions, or other application aspects that may not be available via application presentation 113 due to their respective license states.

Application process 200 may be performed with respect to application 103 and application 105 as well. For example, upon initiating application 103, license information 107 can be accessed to determine the state of the license for application 103. Application 103 may then be presented in accordance with the license state. Similarly, license information may also be accessed to determine the state of the license for application 105. However, because application 105 is associated with developer B, and not developer A, it is license information 109 that is accessed, rather than license information 107. Application 105 may then be presented in accordance with its license state.

While application process 200 generally refers to identifying license information, identifying the state of a license, and presenting an application, variations of application process 200 are possible. For example, a variation of application process 200 may involve initiating each of the aforementioned steps, in addition to or in place of actually performing each of the aforementioned steps. For example, a variation of application process 200 may include some or all of initiating the identification of license information, initiating the identification of the state of the license, and initiating the presentation of an application in accordance with its license state.

Computing system 300, referred to in FIG. 3, may be representative of any computing system or systems on which application process 200 or variations thereof may be suitably implemented. Optionally, computing system 300 may also be suitable for implementing all of or portions of application environment 100. Examples of computing system 300 include mobile computing devices, such as cell phones, tablet computers, laptop computers, notebook computers, and gaming devices, as well as any other type of mobile computing devices and any combination or variation thereof. Examples of computing system 300 also include desktop computers, server computers, and virtual machines, as well as any other type of computing system, variation, or combination thereof.

Computing system 300 includes processing system 301, storage system 303, software 305, communication interface 307, and user interface 309. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for application process 200 or variations thereof. Computing system 300 may optionally include additional devices, features, or functionality not discussed here for purposes of brevity and clarity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations of processing devices, or variations thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. In addition to storage media, in some implementations storage system 303 may also include communication media over which software 305 may be communicated. Storage system 303 may be implemented as a single storage device but may also be implemented across multiple storage devices or sub-systems co-located or distributed relative to each other. Storage system 303 may comprise additional elements, such as a controller, capable of communicating with processing system 301.

Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

Software 305 may be implemented in program instructions and among other functions may, when executed by computing system 300, direct computing system 300 to identify license information based on a developer profile for an application, determine a license state for the application from the license information, and present the application in accordance with the license state. Software 305 may include additional processes, programs, or components, such as operating system software or other application software. Software 305 may also comprise firmware or some other form of machine-readable processing instructions executable by processing system 301.

In at least one implementation, the program instructions may include first program instructions that direct processing system 301 to initiate storing license information in a keychain data structure and second program instructions direct processing system 301 to initiate reading the license information from the keychain data structure. In one scenario, an application that is subject to a license may include the first and second program instructions, while in another scenario a utility application with which the application communicates may include the first and second program instructions.

In general, software 305 may, when loaded into processing system 301 and executed, transform processing system 301, and computing system 300 overall, from a general-purpose computing system into a special-purpose computing system customized to facilitate application licensing as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement application process 200 (and variations thereof) and optionally all or portions of application environment 100. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to application environment 100. As an example, application 101 could be considered transformed from one state to another when subject to application process 200 or variations thereof. In a first state, computing system 300 may render application presentation 111 due to the state of the license for application 101. Upon a change occurring with respect to the license state, computing system 300 may render application presentation 113 due to the changed state of the license for application 101. In another example, application 101 may be launched with its license state in an unknown or initial state. Upon accessing licensing information 107 based on the developer profile associated with application 101, the license state for application 101 can be determined or updated and application 101 presented accordingly.

Referring again to FIG. 3, communication interface 307 may include communication connections and devices that allow for communication between computing system 300 and other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 309 may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 309. The aforementioned user input devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

FIG. 4 illustrates two views respectively of communication device 400 in an implementation. View 4A illustrates internal components of communication device 400, while view 4B illustrates external aspects of communication device 400. In particular, view 4A illustrates process system 401, storage system 403, software 405, communication interface 407, and user interface 409. Software 405 includes operating system 406 and applications 408. Communication device 400 is in communication with application store 415 over communication network 413. View 4B illustrates control element 417, display 419, application menu 421, and application icons 423, 425, and 427. Application icons 423, 425, and 427 are representative of icons that may correspond to applications 408. Communication device 400 may optionally include additional devices, features, or functionality not discussed here for purposes of brevity and clarity.

Communication device 400 is representative of any type of computing system or device capable of facilitating application licensing for applications experienced thereon. Examples of communication device 400 include cell phones, tablet computers, laptop computer, netbooks, ultra-books, personal digital assistances, e-readers, gaming devices, media players, Internet appliances, desktop computers, and any other type of suitable computing system. In particular, processing system 401 loads and executes software 405 from storage system 403, including operating system 406 and applications 408. When executed by communication device 400 in general, and processing system 401 in particular, software 405 directs communication device 400 to operate as described herein with respect to FIGS. 5-8.

For example, communication system 400 may execute all or portions of operating system 406 to render application menu 421. Examples of operating system 406 include the Android, iOS, Mac, Linux, and Windows® operating systems. User interface 409 may include or be operatively coupled with display 419 to receive and process user input, such as a touch, multi-touch, swipe, gesture, or other suitable input. In response to various use inputs, one or more of applications 408 may be launched, and upon launch, the one or more applications may be rendered on display 419. Similarly, user interface 409 may include or be operatively coupled with control element 417 and may be capable of receiving and processing user input therefrom. The general operation of communication device 400 and the interaction among its components is generally well known and need not be discussed at length here. However, FIGS. 5-8 are provided for illustrative purposes to demonstrate some capabilities, features, and functions of communication device 400 that allow for enhance application licensing.

In this implementation, it is assumed for illustrative purposes that application icon 423 corresponds to an application that is associated with one developer, while application icon 425 and application icon 427 correspond to two applications respectively that are both associated with a different, second developer. Application icon 425 and application icon 427 may correspond to applications that are considered to belong to a suite of program applications, such as a productivity suite, gaming suite, communication suite, or the like, as indicated by the graphical symbols provided in their lower left corners. For example, a suite of productivity applications may include a word processing application and a spreadsheet application, and possibly another productivity application or applications in addition to or in place of these.

Application icon 423 includes a different graphical symbol, indicative that application icon 423 corresponds to an application associated with a different developer. Note that such graphical symbols need not be present or otherwise included to identify an application icon or application as associated with any particular developer, but rather are merely provided for illustrative purposes.

FIG. 5 illustrates an operational sequence 500 involving communication device 400. Initially at time T1, an application 435 is launched, possibly in response to a gesture, selection, or other suitable input corresponding to application icon 425 from application menu 421. For example, a user may touch a portion of display 419 corresponding to application icon 425, thereby triggering the launch of corresponding application 435.

Communication device 400 initially presents application 435 in an unpaid mode. This may occur because, for example, licensing information associated with the developer of application 435 indicates that the license is in an unpaid state. Other modes corresponding to other license states, such as free, paid, and recently expired are possible and may be considered within the scope of the present disclosure. The unpaid mode results in a limited application experience. For example, while application features 436, 437, and 439 are enabled, as illustrated by solid lines, feature 438 is at least partially or completely disabled, as illustrated by dotted lines and italic font. In other words, a user may only enjoy a limited application experience when in the unpaid state.

At a later time T2, a suite license may be obtained. The suite license may be obtained in a number of ways, such as by purchasing the suite license from application store 415, verifying that a user is entitled to an already purchased or subscribed license, or in some other manner. Regardless of the manner in which a suite license may be obtained, the presentation of application 435 is changed from the unpaid mode to a paid mode. In the paid mode, feature 438 is now available to the user, along with features 436, 437, and 439. In other words, in the paid mode the user may enjoy a fuller application experience relative to that in the unpaid mode. In addition, because a suite license was obtained, other applications within the suite may also be available in a paid mode.

For example, at time T3 application icon 427 may be selected, initiating the launch of a corresponding application 445. Licensing information associated with the developer of that application may again be examined to determine the license state for the application. In this implementation, the license state is a paid state because a suite license had been obtained earlier at step T2. Application 445 is thus presented with a full application experience enabled. For example, features 446, 447, and 448 are all illustrated as enabled. In an unpaid or otherwise limited mode, one or more of the features of other aspects of application 445 may be presented in a different manner, such as a disabled mode.

While not illustrated, it may be understood that a similar scenario may be carried out with respect to other applications. For example, in a scenario where application icon 423 is selected, a corresponding application may be launched. In response to launching the application, licensing information is accessed based on the identity of the developer of that application. As discussed above, application icon 423 may be associated with an application developed by a different entity than the developer of applications 435 and 445. Thus, different licensing information may be examined. Based on the state of the license as indicated by the license information, a presentation or operational mode for the application may be determined. The application may then be presented accordingly.

While the foregoing discussion of FIG. 5 makes reference to a suite license, it may be understood that a suite license is merely exemplary. Other types of licenses are possible and may be considered by various scenarios. For example, an application may be launched in an unpaid mode, after which a license for the application may be obtained. Subsequent use or launches of the application may result in presentation of the application in a paid mode. In either case, license information that indicates the state of a license for a given application is accessed based on the developer profile associated with the application, a discussion of which follows in more detail with respect to FIGS. 6-8.

Referring now to FIG. 6, a detailed view 600 of software 405 from FIG. 4 is illustrated. Detailed view 600 includes operating system 406 and applications 408. Operating system 406 includes utility application 456, while applications 408 include application 435, application 443, and application 445. As represented by circular symbols, application 435 and application 445 are both associated with the same developer, while application 443 is associated with a different developer.

In operation, applications 435, 443, and 445 exchange license communications with utility application 456 in order to obtain, update, or otherwise interact with licensing information. Utility application 456 allows each application to access specific license information based on the identity of the developer of the application. In this implementation, application 443 accesses license information 457, while applications 435 and 445 access license information 459 because they are associated with the same developer. From time to time, applications 435, 443, and 445 may also exchange license communications with application store 415 in order to obtain, verify, or update a license, or perform any other action relevant to a license.

FIG. 7 illustrates one particular operational scenario 700 in an implementation, a discussion of which proceeds with reference to FIG. 6. Application 443 communicates with utility application 456 to request licensing information. Utility application 456 determines the identity of the developer associated with application 443. Identifying the developer may be accomplished in a variety of ways. In some scenarios, utility application 456 may maintain and access a list of applications installed on communication device 400 which identifies the developer associated with each application. When in communication with an application to access license information, utility application 456 may reference the list to determine the associated developer. In other scenarios, the application requesting access to license information may itself identify the developer to utility application 456. In yet other scenarios, utility application 456 may communicate with a remote or online service capable of identifying the developer associated with a requesting application. Other mechanisms for identifying an associated developer are possible and may be considered within the scope of this disclosure.

Upon identifying the developer associated with application 443, utility application 456 retrieves the corresponding license information. In this implementation, utility application 456 retrieves license information 457, which is then provided to application 443. It is assumed for exemplary purposes that license information 457 indicates that the state of application 443 is paid. Application 443 can then be presented accordingly in a paid mode.

Further in this example, application 435 may be launched, initiating a request to utility application 456 for license information. Utility application 456 determines the identity of the developer associated with application 435 and retrieves corresponding license information 459. The identity of the developer may be determined in a number of ways, such as be referencing a profile list, receiving the identity from the application, or querying a remote service, as well as in any other suitable manner. License information 459 is returned to application 435 and processed to determine a license state. Application 435 may then be presented in accordance with the license state. In this example, it is assumed for exemplary purposes that the state of the license for application 435 is unpaid. Application 435 may automatically or in response to a user interaction communicate with application store 415 to accomplish a license purchase. A license or license information is returned to application 435, at which time the presentation of application 435 may be changed to a paid mode.

Application 435 can also provide an update to utility application 456 indicative of the newly paid state of the license. Optionally, application store 415 may communicate the license, license information, or update to utility application 456. At yet another time, application 445 may be launched, triggering a license request to utility application 456. Utility application 456 retrieves and provides newly updated license information 459 upon identifying the developer of application 445. Application 445 is presented in a paid mode based on the paid state of the license as indicated in license information 459.

FIG. 8 illustrates application environment 800 in an implementation representative of an environment in which developer-based access to license information may be employed. Application environment 800 includes applications 801, 803, and 805, keychain application 807, profile database 809, and keychain data 811 and 813. In operation, applications 801, 803 and 805 each communicate with keychain application 807 to store or otherwise provide license information and to read or otherwise obtain license information. Keychain application 807 communicates with keychain data to store license information and read license information.

In response to requests for license information, keychain application 807 communicates with profile database 809 to determine which keychain data may be accessed. For example, keychain application 807 may communicate an application identifier or some other credential to profile database 809. Profile database 809 returns a developer identifier, and optionally may identify which keychain data to access.

However, keychain application 807 may itself determine which keychain data to access based on the developer identity returned by profile database 809.

Regardless, keychain application 807 accesses or provides access to the relevant keychain data to the requesting application based on the developer profile of the application. For example, application 801 may be associated with developer X, and thus given access to keychain data 811, while both applications 803 and 805 may be associated with developer Y and both given access to keychain data 813. Note that keychain data may include not only the license state of an application, applications, or suite of applications, but also other sensitive information, such as passwords.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
one or more computer readable storage media; and
an application stored on the one or more computer readable storage media and comprising program instructions executable by a processing system to facilitate application licensing for the application, wherein the program instructions, when executed by the processing system, direct the processing system to at least:
in response to the application launching, communicate a request from the application to a utility application to access license information, for a suite of applications with which the application is associated, in a keychain data structure accessible based on an identity of a developer indicated by a developer profile for the application;
identify a state of a suite license for the suite of applications from the license information;
determine an application mode based on the state of the suite license; and
present the application in the application mode;
wherein the utility application comprises a keychain service application and wherein the keychain data structure holds the license information and at least a password.

2. The apparatus of claim 1 wherein the state of the license for the suite of applications comprises one of a plurality of license states.

3. The apparatus of claim 2 wherein the application mode comprises a one of a plurality of modes.

4. The apparatus of claim 3 wherein the plurality of modes comprises an unrestricted access mode.

5. The apparatus of claim 4 wherein the plurality of modes further comprises a restricted access mode.

6. The apparatus of claim 5 wherein the plurality of license states comprises a fully paid state, a free state, and a recently expired state.

7. The apparatus of claim 6 wherein the plurality of modes further comprises a temporality unrestricted access mode.

8. The apparatus of claim 1 further comprising the processing system, wherein the suite of applications comprises a suite of productivity applications comprising a word processing application and a spreadsheet application, and wherein the keychain data structure comprises a data structure accessed through the keychain service application.

9. A method for facilitating application licensing, the method comprising:
in a communication device having a plurality of applications installed thereon, an application of the plurality of applications communicating a request from the application to a utility application to identify license information for the application stored in a keychain data structure accessible based on an identity of a developer indicated by a developer profile associated with the application;
in the communication device, the application launching and responsively identifying a state of a license for the application from at least a portion of the license information;
in the communication device, the application determining an application mode based on the state of the license; and
in the communication device, the application initiating presentation of the application in the application mode;
wherein the utility application comprises a keychain service and wherein the keychain data structure holds the license information and at least a password.

10. The method of claim 9 wherein the license comprises a suite license for a suite of applications to which the application belongs.

11. The method of claim 10 wherein the suite of applications comprises a word processing application and a spreadsheet application.

12. The method of claim 11 wherein the state of the license comprises one of a plurality of license states.

13. The method of claim 9 wherein the plurality of license states comprises a fully paid state, a free state, and a recently expired state.

14. The method of claim 9 wherein the application mode comprises a one of a plurality of modes comprising an unrestricted access mode, a restricted access mode, and a temporality unrestricted access mode, and wherein the keychain data structure comprises a data structure accessed through the keychain service application.

15. A computing apparatus comprising:
a computer readable storage media; and
an application comprising:
first program instructions stored on the computer readable storage media that, when executed by a processing system, direct the processing system to access a keychain data structure through a utility application, wherein the keychain data structure is stored locally with respect to the application and is associated with a developer of the application, and initiate storing license information for the application in the keychain data structure; and second program instructions stored on the computer readable storage media that, when executed by the processing system, direct the processing system to initiate reading the license information from the keychain data structure via the utility application when the application launches, determine an application mode based on the state of the suite license, and present the application in the application mode.

16. The computing apparatus of claim 15 wherein to initiate storing the license information in the keychain data structure the first program instructions direct the processing system to initiate a first request to the utility application to access the keychain data structure, and wherein to initiate reading the license information from the keychain data structure the second program instructions direct the processing system to initiate a second request to the utility application to access the keychain data structure.

17. The computing apparatus of claim 16 wherein the application comprises a productivity application that includes the first program instructions and the second program instructions.

18. The computing apparatus of claim 16 wherein the utility application comprises a keychain service application through which the productivity application accesses the keychain data structure to read the license information and wherein the keychain data structure comprises a data structure accessed through the keychain service application.

19. The computing apparatus of claim 18 wherein the productivity application is associated with a suite of program applications and wherein the license information indicates a state of a license for the suite of program applications.

20. The computing apparatus of claim 18 further comprising the processing system configured to execute the first program instructions and the second program instructions.

* * * * *